May 17, 1966  B. D. HALL  3,251,132
MEASURING APPARATUS
Filed Oct. 18, 1963 2 Sheets-Sheet 1
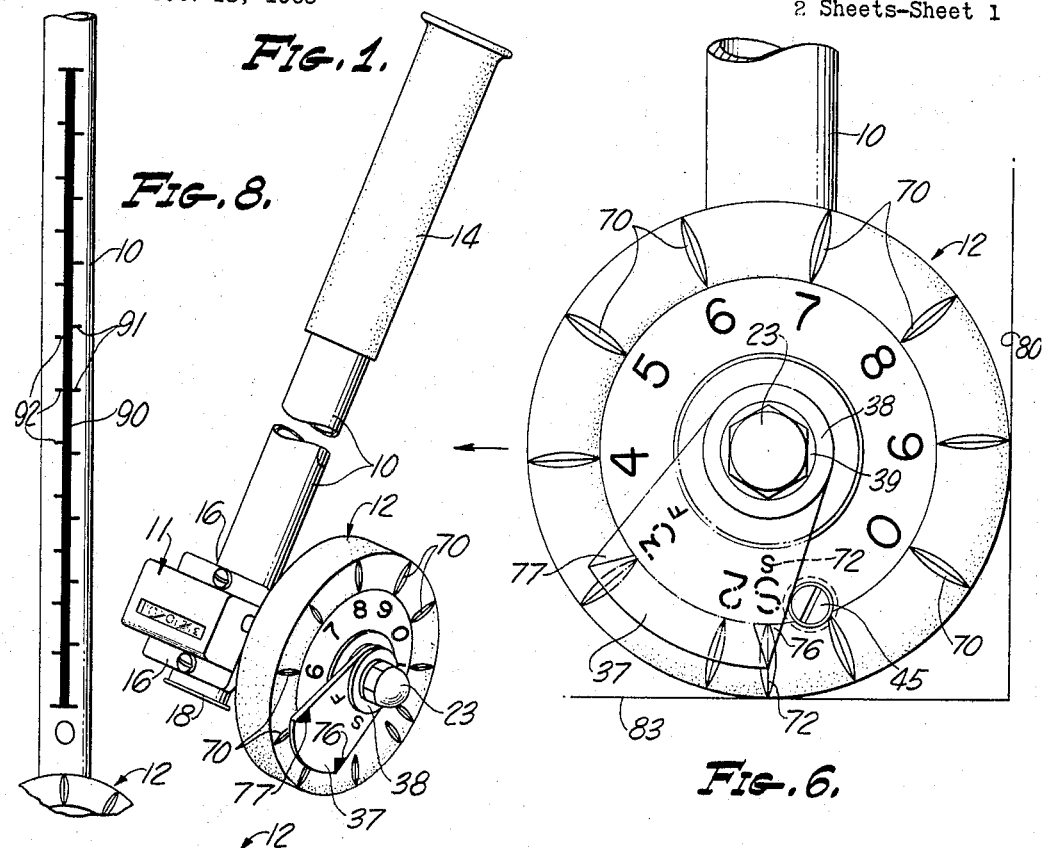
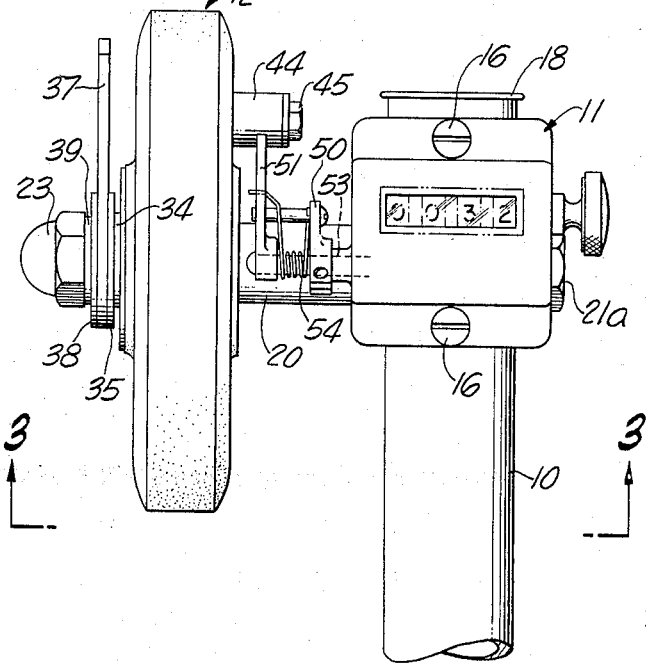
INVENTOR.
BEN D. HALL
BY
ATTORNEYS May 17, 1966  B. D. HALL  3,251,132
MEASURING APPARATUS
Filed Oct. 18, 1963  2 Sheets-Sheet 2
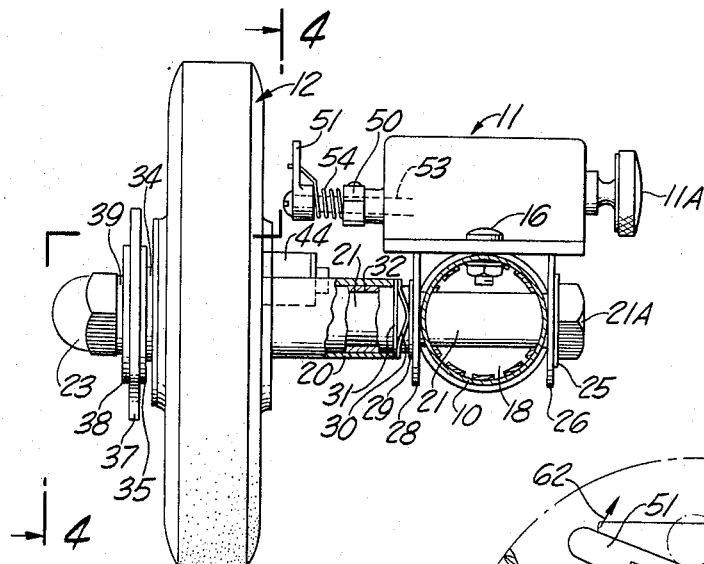
FIG. 3.
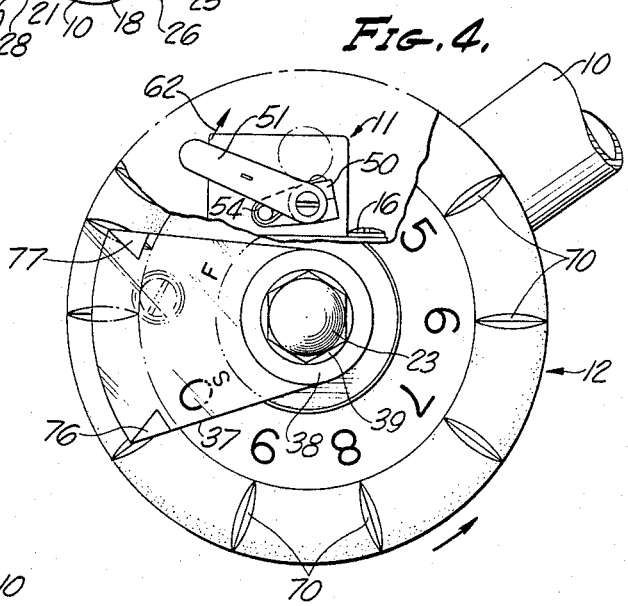
FIG. 4.
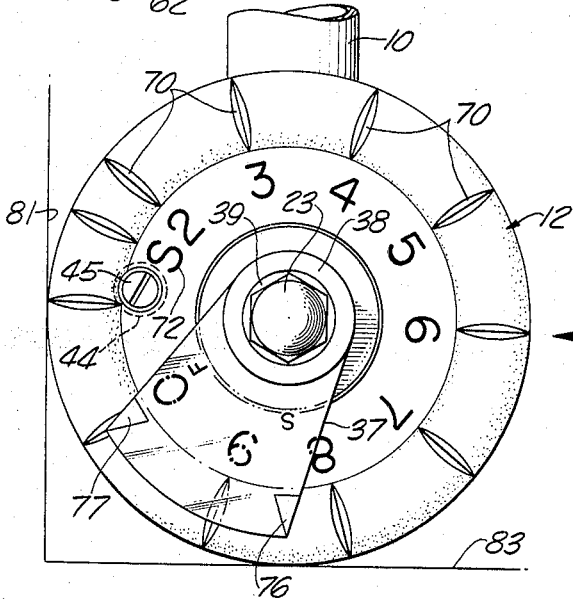
FIG. 5.
FIG. 7.
INVENTOR.
BEN D. HALL
BY
ATTORNEYS

United States Patent Office 3,251,132
Patented May 17, 1966

3,251,132
MEASURING APPARATUS
Ben D. Hall, 1151½ Crenshaw Blvd.,
Los Angeles 19, Calif.
Filed Oct. 18, 1963, Ser. No. 317,187
10 Claims. (Cl. 33—141)

The present invention relates to measuring apparatus of the type in which the ground or floor engaging wheel operates a counter to indicate distances traversed by the wheel.

While measuring apparatus of this character is generally well-known in the art, the present invention provides certain improvements both in structure and in results achieved thereby.

An object of the present invention is to provide measuring apparatus of this character which is relatively simple, inexpensive, rugged, foolproof and light in weight.

Another object of the present invention is to provide apparatus of this character which is particularly useful in accurately measuring distances between walls so that an appraiser may accurately establish the floor space of houses and buildings in general.

Another specific object of the present invention is to provide apparatus of this character involving a new cooperation between the counter and the ground or floor engaging wheel.

Another specific object of the present invention is to provide measuring apparatus of this character that incorporates stationary indicia means cooperating with indicia on the measuring wheel to provide compensation for the diameter of the wheel when the apparatus is being used to measure distances between walls.

The features of the present invention which are believed to be novel are set forth with particularity in the appended claims. This invention itself, both as to its organization and manner of operation, together with further objects and advantages thereof, may be best understood by reference the following description taken in connection with the accompanying drawings in which:

FIGURE 1 is a perspective view illustrating measuring apparatus embodying features of the present invention with a handle portion being broken away.

FIGURE 2 is generally a top plan view.

FIGURE 3 is a view taken generally in the direction indicated by the line 3—3 in FIGURE 2.

FIGURE 4 is a view taken generally in the direction indicated by the line 4—4 in FIGURE 3.

FIGURE 5 illustrates a portion of the counter operating mechanism.

FIGURE 6 and FIGURE 7 are generally side views of the measuring wheel with such measuring wheel however being in different positions with respect to stationary indicia means that provide the operator to make compensations for the wheel diameter in making wall to wall measurements.

FIGURE 8 shows a portion of the handle having means thereon for converting measurements from tenths of a foot into inches or vice versa.

The apparatus involves a handle or pole 10 on which is mounted a counter 11 which is operated by a wheel 12, the wheel 12 having a circumference exactly equal to one foot and being rotatably supported with respect to the pole or handle 10.

The pole or handle 10 is tubular and is of aluminum with a tubular rubber hand grip 14 frictionally held on the upper end of the pole 10.

The counter 11 is of conventional construction, for example, the type furnished by the Presin Company of Bridgeport, Connecticut, and is secured on the lower end of pole 10, as illustrated in FIGURE 2, by two bolts 16. The pole or handle 10 may, for example, be 41 inches in length and may be closed at its lower end by a sheet metal plug 18 having spring fingers that resiliently engage the inner surface of the pole 10.

The wheel 12 is rotatably supported with respect to the pole 10 using the following construction. The wheel 12 of, for example, hard rubber is provided with an elongated tubular hub member 20 for porviding a desired spacing between the wheel 12 and the handle 10. This hub portion 20 is rotatably mounted on an elongated bolt 21 which has the head 21A and which screw threadedly receives a stop nut 23. The bolt 21 extend in turn through the following elements: a lock washer 25; a plain washer 26; the tubular handle 10; a plain washer 28, a washer 29; a spring washer 30; a plain washer 31; a spacer sleeve 32 on which the hub portion 20 rotates; a washer 34; a washer 35; an indicia plate or sector 37, a washer 38; a lock washer 39; and such bolt is threaded to carry the clamping nut 23. The nut 23, when tightened, serves to stationarily clamp the spacer sleeve 32 and the indicia plate 37 with respect to the bolt 21. This particular clamping structure conveniently allows the reference plate 37 to be accurately adjusted. The spring washer 30 acting on the wheel hub causes slight drag on the wheel hub to assure accurate start and stop of the wheel 12 particularly so in making wall to wall measurements. The spring washer 30 is in the form of a disc of spring steel which is curved and which is compressed in assembly accomplished by tightening of nut 23. This construction is simple and avoids the necessity of cumbersome braking and locking arrangements.

The wheel 12, as seen in FIGURE 2, has mounted thereon a cylindrical post 44 by bolt 45, such post 44 being located, of course, away from the rotational axis of the wheel 12 and serves as a cam or actuating member for operating the top going stroke counter 11, once per revolution of wheel 12. The actuating member for the counter 11 itself is an oscillatable lever 50 which operates through an angle of approximately sixty degrees with movement thereof in one direction causing the counter to add an additional numeral which in this instance is representative of one foot, with movement in the opposite direction being a return movement and producing no operation of the counter. This actuating lever 50 cooperates with a one way clutch element 51, also in the nature of a lever which is pivoted on the counter shaft 53. A torsion spring 54 acting between the levers 50 and 51 urges the lever 51 into engagement with the actuating lever 50. This lever 51 is engageable with the previously mentioned wheel cam 44 once per revolution of wheel 12. Thus, as illustrated in FIGURE 5, when the cam 44 is rotated in the direction indicated by the arrow 60 it engages the lever 51 to cause it to operate the counter lever 50 upon counterclockwise rotation of the lever 51 as indicated by the arrow 62. After the cam 44 moves out of engagement with the lever 51 there is a return movement of the levers 50 and 51 without operation of the counter and the lever 51 is thereby placed in a position where it is again in the path of movement of the cam 44 for the next succeeding count.

It will be seen that the wheel 12 has ten equally spaced marks thereon corresponding from zero to ten with the distance between each of the markings 70 thus corresponding to one tenth of one foot. If desired these markings may be in terms of inches in which of course there would be twelve equally spaced markings instead of ten equally spaced markings. It will be seen also that the wheel 12 has another marking 72 characterized by the inscription S on the wheel 12. It will also be seen that the stationary indicia plate 37 of transparent material has two markings thereon 76 and 77 characterized respectively by the letters S and F inscribed on such indicia plate 37. These additional markings have significance, in accordance with important features of the present invention when wall to wall measurements are to be accurately made as, for example, by appraisers of the value of houses and buildings in general in terms of the square footage of such structures.

The indicating plate 37 is fixedly adjusted, using the structure described above, for achieving accurate measurements when such measurements are made with respect to a wall, as for example in wall to wall measurements. FIGURES 6 and 7 are useful in explaining the reference points used in making such accurate measurements. FIGURE 6 illustrates a wall 80 from which measurements are made and FIGURE 7 illustrates a wall 81 to which measurements are made. In other words, the apparatus accurately measures the distance between the walls 80 and 81 (FIGURES 6 and 7) even though the wheel 12 does not rotate the full distance of the floor 83 between such walls 80 and 81 due to the fact that such walls 80 and 81 prevent such full traversing of the wheel 12. At the start of the measurements, as indicated in FIGURE 6, with the axis of pole 10 extending vertically the wheel 12 is intially rotated manually to align the indicia 72 and 76, i.e. the S marks denoting Start on the wheel 12 and indicia plate 37 respectively; and when such manual adjustment is made the wheel is placed against the wall 80, as shown in FIGURE 6, and the operator handling the rod or handle 10 rolls the wheel 12 along the floor 83 to the opposite wall 81 in FIGURE 7, and, when this is done, the operator again moves the pole 10 to a vertical position as shown in FIGURE 7 and raises the handle without producing relative movement between the handle and the wheel and the reading on the wheel 12 is then made with reference to the other mark 77 on the indicia plate 37 and this reading when added to the reading on the foot reading counter 11 accurately represents the actual distance between the walls 80 and 81. It will be noted that for these purposes the peripheral distance on the wheel 12 between the "0" mark on the wheel 12 and the S mark 72 on the wheel is equal to 12 inches divided by 2 pi or approximately 1.58 tenths of a foot which is the radius of a wheel having a circumference of 12 inches; and likewise it will be seen that the angular distance between the S and F marks 76 and 77 on the indicia plate 37 corresponds to this same distance, i.e. the distance between the "0" mark on the wheel 12 and the S mark 72 on the wheel.

It will be observed that the counter 11 indicates the number of revolutions only when the measuring wheel 12 is rotated in one direction and the cam 44 on the wheel 12 is positioned such that it operates the counter when and as the 0 mark on the wheel passes through a prolongation of the axis of handle 10. Should the measuring wheel 12 be rotated in the opposite direction the counter 11 is ineffective to indicate such reverse rotations of the measuring wheel. The counter 11 has a conventional resetting mechanism including a knob 11A for effecting a resetting of the counter.

It is observed also that the measuring wheel 12 is calibrated in terms of tenths of a foot for convenience in obtaining readings which may be conveniently multiplied in achieving square footage. If desired, the handle 10 may have marked thereon a straight line 90 on one side of which there is indicia 91 representing tenths of a foot and on the other side indicia 92 representing twelfths of a foot so that the wheel readings, if desired, may be easily converted, using such conversion on the handle from tenths of a foot to inches or vice versa in those instances when the wheel 12 markings are in terms of inches instead of in terms of tenths of a foot.

It will be noted that the closure member 18 is sometimes often referred to as a chassis plug.

The plate 37 is preferably not only transparent but also somewhat flexible to prevent damage.

While a tubular rubber sleeve 14 is shown in the drawings, this sleeve which is actually a convenient grip may be of the type which has depressions therein for the operator's fingers to allow him to feel the general orientation of the device so that he does not have to constantly look at the wheel when rolling the device.

Also, it is within the purview of the present invention to provide the cam 44 using structure other than spcifically disclosed in the drawings, for example, the cam bolt may be molded into rubber not only for purposes of strength but also to provide an unbroken surface on the viewing side of the wheel so that the end of the bolt shown in FIGURE 7 would not then be visible and instead a numeral 1 may be placed at that point. Also, the cam, if desired, may be an eccentrically drilled rod which is maintained in adjusted position by a nut whereby unloosening of the nut may allow one to adjust the cam to accurately establish the zero reading of the device, i.e. the point on the wheel at which the counter is operated.

With reference to the above described wall-to-wall measurements it is, of course, not necessary that the operator maintain the handle 10 in a vertical position while traversing the distance between walls but the handle 10 may be rotated so that its axis makes a convenient angle with the plane of the floor or ground such as, for example, an angle of approximately 45 degrees.

It has been previously mentioned that the spring washer 30 imposes a drag on rotation of the wheel and that when and as the wheel rotates with the zero portion thereof engaging the ground, the counter is operated. In this connection, it will be observed that the lever 51 is in engagement with the cam 44 and that the spring 54 serves also to impose a resistance to movement of the wheel in reverse and this assures initial setting of the wheel in a zero position, a position which is less likely disturbed when the operator moves the wheel to engage the ground.

The general purpose of the clutch, in addition to the process mentioned above, is to prevent the cam from knocking the stationary lever out of adjustment and also to prevent damage to the internal construction of the counter.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A measuring apparatus of the character described comprising a handle, a counter mounted on said handle, said counter having an actuating member, said actuating member comprising a lever pivotally mounted on said counter, a second lever pivotally mounted on said lever about the same pivotal axis as the first mentioned lever, spring means acting between said levers urging the same together, a measuring wheel having a cam member thereon engageable with said second lever once per revolution of said measuring wheel, said second lever cooperating with the first mentioned lever to register a count on said counter only when said measuring wheel is rotated in one direction and being ineffective to register a count on said counter when said measuring wheel is rotated in the opposite direction, a bolt extending radially through said handle, a sleeve mounted on said bolt, said wheel having an elongated hub portion rotatably mounted on said sleeve, spring means acting between said wheel and said handle to impart a drag to said wheel, fastening means on said bolt serving when fastened on said bolt to compress said spring, said measuring wheel having indicia thereon, a plate mounted on said bolt and having indicia thereon cooperating with indicia on said measuring wheel.

2. In a measuring apparatus of the character described, a handle, a measuring wheel rotatable on said handle and having indicia thereon, a counter on said handle operated upon rotation of said wheel, means mounted stationarily with respect to said handle and having spaced indicia thereon cooperating with said indicia on said wheel, said spaced indicia being spaced a distance corresponding to the radius of the wheel.

3. Apparatus as set forth in claim 2 in which said wheel indicia includes a zero mark and a mark peripherally spaced from said zero mark a distance corresponding to the radius of the wheel.

4. Apparatus as set forth in claim 3 in which said counter is operated when and as the peripheral portion of the wheel indicated by said zero mark rotates on a flat surface.

5. Apparatus as set forth in claim 1 in which said handle has a conversion scale thereon for converting tenths of a foot to inches and vice versa.

6. Measuring apparatus as set forth in claim 2 including conversion means on said handle for converting tenths of a foot to inches and vice versa.

7. In measuring apparatus of the character described wherein rotation of a wheel about an axle serves to produce actuation of a single revolution counter and said measuring wheel having indicia thereon, the improvement which resides in providing a stationary plate on said axle with indicia thereon cooperable with indicia on said measuring wheel, said plate being of transparent material and having two indicia thereon with such two indicia being spaced a distance equal to a circumferential distance of said wheel, said circumferential distance being defined by two spaced indicia on said wheel cooperable with said two indicia on said plate, said circumferential distance being equal to the radius of the wheel.

8. A measuring apparatus of the character described comprising a handle, a counter mounted on said handle, said counter having an actuating member, said actuating member comprising a lever pivotally mounted on said counter, a second lever pivotally mounted on said lever about the same pivotal axis as the first mentioned lever, first spring means acting between said levers urging the same together, a measuring wheel having a cam member thereon engageable with said second lever once per revolution of said measuring wheel, said second lever cooperating with the first mentioned lever to register a count on said counter only when said measuring wheel is rotated in one direction and being ineffective to register a count on said counter when said measuring wheel is rotated in the opposite direction, means rotatably supporting said measuring wheel on said handle, second spring means acting between said wheel and said handle to impart a drag to said wheel, said measuring wheel having first indicia thereon, a plate mounted on said supporting means and having second indicia thereon cooperating with indicia on said measuring wheel.

9. Apparatus as set forth in claim 8 in which said cam member during forward movement of said wheel engages and moves along an outer portion of said second lever to actuate said counter when said first and said second indicia are in predetermined relative relationship to each other.

10. Apparatus as set forth in claim 9 in which during reverse movement of said wheel said cam engages an inner portion of said lever to pivot the same against the action of said first spring means without actuating said counter.

References Cited by the Examiner

UNITED STATES PATENTS

| | | | |
|---|---|---|---|
| 844,364 | 2/1907 | Kimmell | 33—141 |
| 2,123,360 | 7/1938 | Harris | 22—141 |
| 2,595,021 | 4/1952 | Swanson | 33—141 |
| 2,662,292 | 12/1953 | Pickard | 33—141 |
| 2,749,619 | 6/1956 | Todd | 33—141 X |
| 2,863,220 | 12/1958 | Staples | 33—141 X |

FOREIGN PATENTS

| | | |
|---|---|---|
| 103,274 | 5/1874 | France. |
| 276,448 | 7/1951 | Switzerland. |

ISSAC LISANN, *Primary Examiner.*